US007647481B2

(12) United States Patent
Rychlik (10) Patent No.: US 7,647,481 B2
(45) Date of Patent: Jan. 12, 2010

(54) REDUCING POWER BY SHUTTING DOWN PORTIONS OF A STACKED REGISTER FILE

(75) Inventor: Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 11/066,958

(22) Filed: Feb. 25, 2005

(65) Prior Publication Data

US 2006/0195707 A1   Aug. 31, 2006

(51) Int. Cl.
  *G06F 7/38* (2006.01)
(52) U.S. Cl. ..................................... 712/220
(58) Field of Classification Search ................. 712/220
  See application file for complete search history.

(56) References Cited

U.S. PATENT DOCUMENTS

| 6,263,401 | B1 * | 7/2001 | Ross et al. ................... 711/109 |
| 6,345,354 | B1 | 2/2002 | Radivojevic et al. |
| 6,845,445 | B2 | 1/2005 | Marchand et al. |
| 2004/0060015 | A1 | 3/2004 | Mochizuki |
| 2006/0155911 | A1 * | 7/2006 | Gheith et al. ................... 711/5 |
| 2006/0168463 | A1 * | 7/2006 | Terechko et al. ............ 713/324 |

FOREIGN PATENT DOCUMENTS

EP   0676691   3/1995

WO   2004051450   6/2004

OTHER PUBLICATIONS

Jaume Abella et al., "On Reducing Register Pressure and Energy in Multiple-Banked Register Files", 2003 IEEE.*
Ayala et al., "Power-Aware Register Renaming in High-Performance Processors using Compiler Support" Innovative Architecture for Future Generation High-Performance Processors and Systems (IWIA'04), 1527-1366/04 IEEE, pp. 20-27.
International Preliminary Report on Patentability-PCT/US06/006653, The International Bureau of WIPO, Geneva Switzerland-Aug. 28, 2007.
International Search Report-PCT/US06/006653, International Search Authority-European Patent Office-Nov. 15, 2006.
Rakvic, Ryan, "Punctual Data Supply," PhD, Thesis, Carnegie Mellon University, 2003, 108 pages, AAT 3099360.
Rychlik, B., "Reducing Power by Shutting Down Portions of a Stacked Register File in a Fixed Ordering," Qualcomm Invention Disclosure #40770, Jul. 30, 2004.
Written Opinion-PCT/US06/006653, International Search Authority-European Patent Office-Nov. 15, 2006.

* cited by examiner

*Primary Examiner*—Eddie P Chan
*Assistant Examiner*—John Lindlof
(74) *Attorney, Agent, or Firm*—Peter M. Kamarchik; Nicholas J. Pauley; Sam Talpalatsky (57) ABSTRACT

Many processor architectures include registers in the form of a stacked register file, for holding data used during execution of processing operations. As taught herein, the physical registers forming the stack are organized into banks. One or more of the banks is activated and deactivated, as needed to meet the demands of register allocations.

23 Claims, 8 Drawing Sheets

Fig. 12B General Operation - Example of wrapping register allocation in the Stacked Register File Fig. 12A General Operation - Stacked Register file with the Register Save Engine (RSE) and Backing Store

REDUCING POWER BY SHUTTING DOWN PORTIONS OF A STACKED REGISTER FILE

TECHNICAL FIELD

The present teachings relate to techniques to selectively shut down portions of a set of registers, such as banks of registers forming a stacked register file of a processor, such as a microprocessor or compiler or the like.

BACKGROUND

A register file is a high speed storage structure that is used to temporarily store information. Processors typically include one or more register files, to maintain data or instructions relatively close to the processor core. Register files often serve as a primary source of data for use by a processor's execution resources, and high performance processors often include large register files, to take advantage of their low access latency.

Register management techniques allocate registers to processes, fill the registers from slower storage media, and later empty the registers to other storage media as registers are reallocated to other procedures or functions. For example, data from registers used by a first function may be transferred to other storage, while the first function is inactive, if an active second function requires more registers than are currently available. When control is returned to the first function, registers can be reallocated, although they will typically not be the same registers as used by the function during prior activity. To restore activity for the function, the stored data is loaded into the newly allocated registers from storage. To achieve high instruction/cycle (IPC) throughput, modern processors, such as microprocessors and parallelizing compilers, efficient register renaming, register usage, and passing of function parameters are considerations.

Many devices and applications that utilize microprocessors or compilers or the like have low power requirements. Commonly the register file in processors is a major consumer of power due its large number of ports and high speed. In some processors, this is exacerbated by the large number of registers. Furthermore, as transistor technology shrinks, leakage power—present even in un-accessed portions of the register file—becomes more significant. Commonly, processors provide power to all registers in sets all of the time. Often, unused portions of the register file are deliberately not shut off because these registers hold values that could be used at any time, and would be lost if the registers were powered down.

There is continuing need to design processors that require lower power, for example, for application to portable/handheld devices or other applications that have limited or restricted power sources. In support of this general need, there is a specific need for techniques to reduce the power consumed by the groups of registers of a processor, such as the stacked register file.

SUMMARY

To reduce power consumption, a selected portion of a set of registers is shut down when not in use. Specific techniques are disclosed for selecting registers that are activated and registers that are not, so as to provide power savings yet maintain desired performance of the processor that includes the set of registers.

Hence, one aspect of the teachings disclosed herein relates to a power control method for operating registers of a stacked register file in a processor. The method entails receiving information regarding allocations of registers in the stacked register file. The stacked register file is divided into a plurality of banks of registers. The method involves selectively activating and deactivating operation of the banks of registers within the stacked register file, in correspondence to number of register requirements indicated by the received allocations.

The present teachings encompass a variety of algorithms for controlling activation and deactivation of one or more banks in the stacked register file. Two specific examples are discussed in detail. In a first example, the power control algorithm maintains the first bank of registers active and maintains registers of a second bank inactive, in response to an allocation of a number of registers less than or equal to a threshold having a predetermined relationship to the number of registers forming the first bank. In response to an allocation of a number of registers greater than the threshold, the control algorithm maintains the first bank of registers active and activates the second bank of registers.

In a second example of the control algorithm, each allocation of registers indicates a respective top of stack pointer and a respective save/restore point. In response to each allocation, this algorithm operates any bank of the stacked register file having at least one register in a range from the respective save/restore point to the respective top of stack pointer. However, any bank of the stacked register file not having at least one register in that range is inactive.

Other aspects of the teachings disclosed herein relate to stacked register systems for use in processors. In one such aspect, the stack of registers includes a first register bank comprising a first number of registers, and a second register bank comprising a second number of registers. Means are provided for selectively activating and deactivating at least one of the register banks, in response to allocations and de-allocations of registers to processing operations of the processor. The activation and deactivation dynamically adjust the number of the banks that are active as a function of allocated numbers of registers.

In another aspect, a stacked register system for use in a processor includes a stack of registers, comprising register banks, where each register bank includes one or more of the registers. This system also includes a controller, which is responsive to information regarding allocations of registers within the stack, to selectively control ON/OFF status of one or more of the register banks. The controller is responsive to number of registers allocated within the stack, for increasing number of the banks that are ON to satisfy at least one allocation increasing the number of registers. The controller also decreases the number of banks that are ON in response to at least one allocation of a decreased number of registers.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

To reduce power consumption, a selected portion of a set or stack of registers is shut down when not in use, based on analysis of instructions and/or pointers relating to the allocations of registers that will be needed for particular operations. The techniques discussed herein take advantage of several observations. First, the instructions regarding allocation of registers in at least some processors give advance knowledge of the number of registers needed at any point in time. Most functions do not require all of the available registers. Hence, power consumption by the register stack can be saved by shutting down portions of the register file. To appreciate how registers are allocated and used and how processing is controlled to activate and deactivate banks, it may be helpful first to review certain general aspects of the operations of a stacked register file.

With a stacked register file, the compiler manages the mapping of virtual register names to physical register names by allocating and deallocating registers on a theoretically infinite stack using ALLOC instructions. The core function of the ALLOC instruction is to ensure that the number of physical registers requested by the compiler for the current stack frame is available and to adjust the register mapping offset stored in the Register Stack Base (RSB) register. During execution, RSB is added to the virtual register names specified by the compiler to help generate the actual physical register names used by all register-accessing instructions.

The following example demonstrates simplified operation of the ALLOC instruction:

Simplified Assembly:

```
;; Rx = virtual register x
;; PRx = physical register x
;; Assume RSB = 0; 0 local registers
ALLOC 0,2        ;; Request 2 local registers (RSB = 0)
                 ;; Top-of-Stack = 2 (points to PR1)
MOV R0=1         ;; PR0 = 1
ADD R1=R0,3      ;; PR1 = PR0 + 3 (PR1 = 4)
CALL f           ;; Function call f(x)
ALLOC 1,2        ;; Request 1 input register, 2 local registers
                 ;; RSB = (previous local –
                 ;; requested input) = (2–1) = 1
                 ;; Top-of-Stack = 4 (points to PR3)
MOV R1=5         ;; PR2 = 5
MUL R2=R0,R1     ;; PR3=PR1*PR2 (PR3 = 20)
;;MOV R3=7       ;; Illegal! Cannot access beyond Top-of-Stack.
                 ;; Only input + local = 1+2 = 3 registers allocated
```

A feature of this general design is that the ALLOC instruction indicates to the processor exactly the number of registers that the compiler is using in each function, and the compiler should never generate instructions that access registers beyond those explicitly allocated. It should be noted that some architectures actually specify certain registers to be global with no remapping and other registers to be remapped using the mechanism described above. However, for simplicity this document assumes that all the registers are remapped.

During operation, to maintain the illusion of an infinite register stack, allocation of registers beyond the number of implemented physical registers wraps around to stacked physical register 0. In such case a Register Save Engine (RSE) can automatically save and restore data from and to registers as needed to and from a Backing Store held in memory. In such operation, the save/restore point also wraps as needed through the physical register stack (see FIG. 12A and FIG. 12B). In this way, the register stack file acts as a circular buffer containing the most recent frames of register data. The RSE moves data to the Backing Store held in memory ("spill" operations) when not needed by a current allocation, and the RSE restores data from the Backing Store ("fill" operations) to allocated registers when needed. The RSE spills from and fills to registers outside the group or frame that are currently active in the stack.

Figure 1:
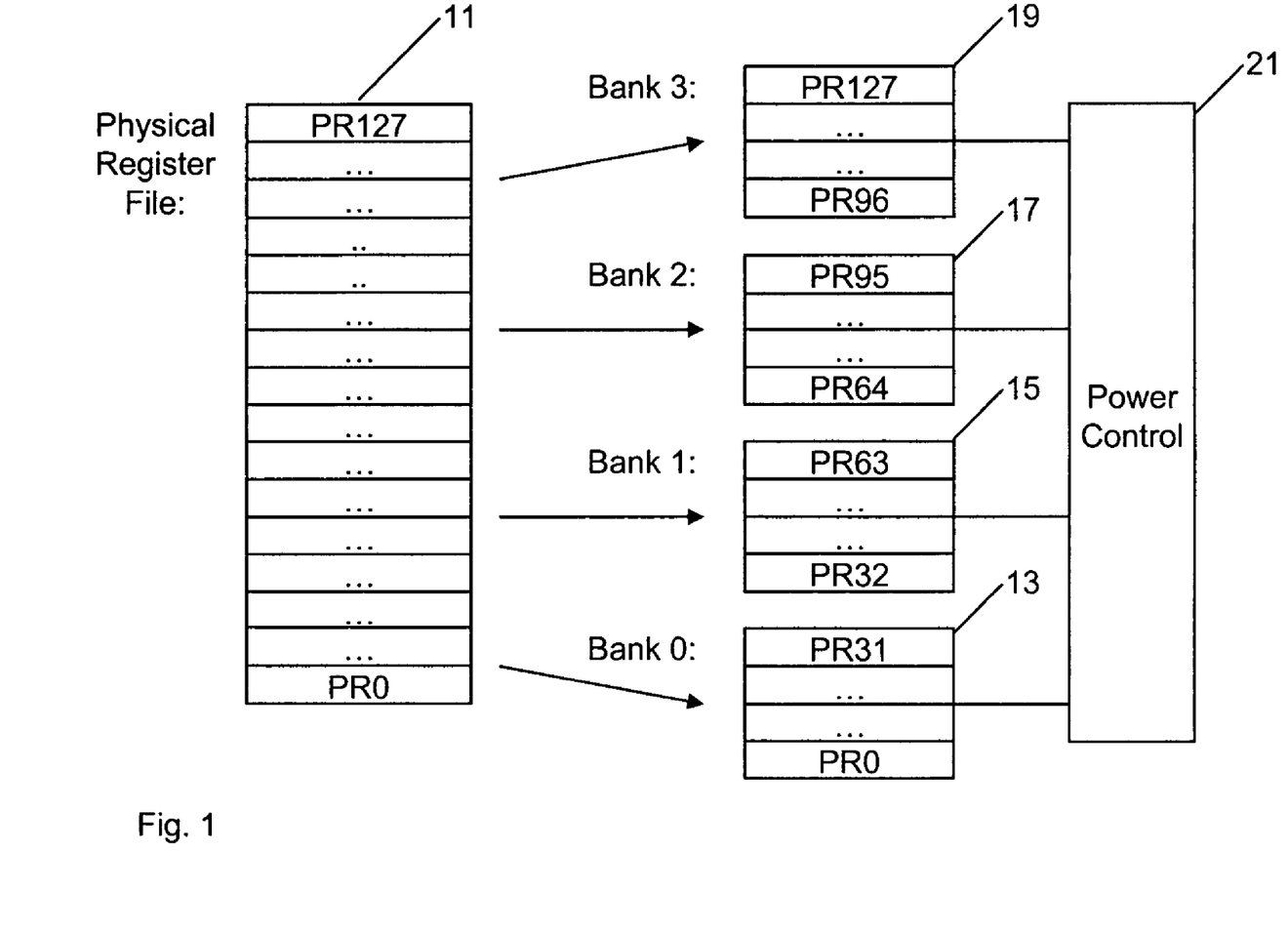
FIG. 1 is a logical diagram, useful in explaining the selective control of activation of banks, formed from a stacked register file.

With reference to FIG. 1, to facilitate power saving, the examples effectively partition the physical register file into banks with individual power control. In the example, the register stack 11 includes 128 instruction registers PR0 to PR127. Each bank includes one or more registers. In the example, since most processing requires 30 registers or less, it is convenient to divide the 128 register stack 11 into four banks of 32 registers each. In the example, Bank 0 (13) now includes registers PR0 to PR31; and Bank 1 (15) now includes registers PR32 to PR63. In turn, Bank 2 (17) now includes registers PR64 to PR95; and Bank 3 (19) now includes registers PR96 to PR127. Those skilled in the art will recognize that other numbers of banks or other numbers of registers in each of the bank may be used, and for example, the number of registers in each bank need not be equal. In the example, each of the banks may be separately activated and deactivated, to dynamically match the number of banks that are active, and thus the number of active registers, to changing number of register requirements. Deactivating unneeded banks conserves power.

To implement the on-off control of the banks, the processor will include a power control 21, associated with the banks of the stacked register file. The control 21 is responsive to allocation information regarding the number of registers needed. In some processors, for example, the ALLOC and other instructions provide hints regarding register usage, which the power control 21 judiciously uses to power the banks ON/OFF as needed and to adjust the various stack maintenance pointers.

The power control selectively activates and deactivates the banks of the divided register stack, using an appropriate algorithm. In one example, the algorithm utilizes fixed ordering of the banks as they are powered ON and powered OFF, to reduce the frequency of bank activation/deactivation. The fixed ordering algorithm commonly keeps the first bank ON and turns ON additional banks as allocation of registers reach or pass thresholds related to the numbers of the registers corresponding to the boundaries of the banks. Banks are deactivated in reverse order as register allocations decrease.

In another example, the algorithm utilizes variable ordering of the banks as they are powered ON and powered OFF, to minimize the number of banks that are simultaneously active and thus increase the savings in power consumption. Where the processor provides pointers for top of stack (TOS) of the allocated registers and RSE save/restore point (bottom of allocated stack), the algorithm activates and deactivates banks as the pointers move through the banks. Banks having one or more registers in the range from one pointer to the other (or between associated offset values) are active. Banks with no register in that range are inactive. As the top of stack pointer approaches and enters a new bank, the control activates that bank. As the save/restore point leaves a bank, that bank can be deactivated.

Figure 2:
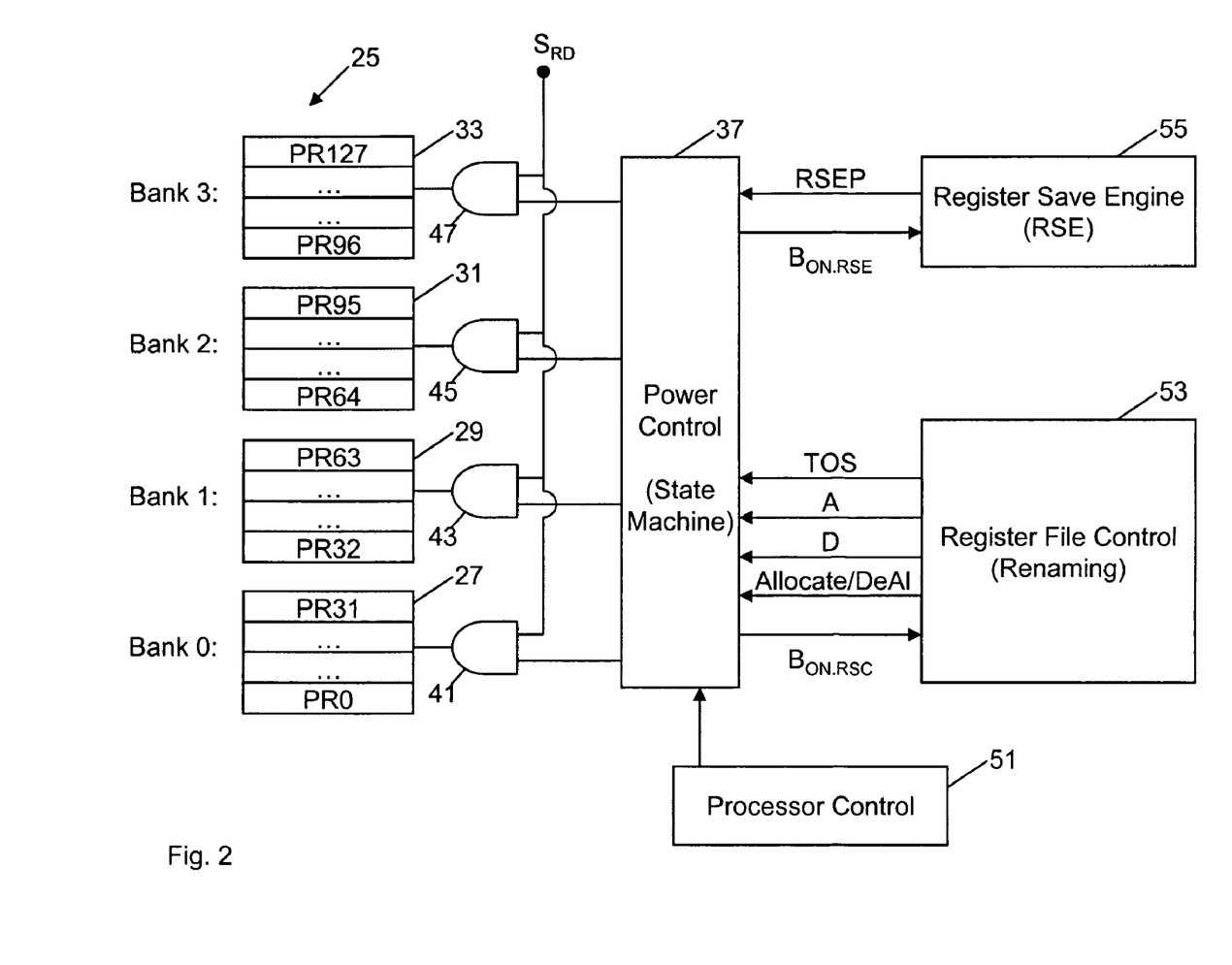
FIG. 2 is a functional block diagram of a portion of a processor, including the banks and power control of a stacked register file and certain elements that interact with that control, for implementing a first example of a power control algorithm that utilizes fixed ordering to activate and deactivate the banks of the stacked register file.

FIG. 2 is a functional block diagram of a portion of a processor, implementing the power control, using the fixed ordering algorithm. Elements of the processor are shown that are involved in the register operations and power control of the register banks. Those skilled in the art will recognize that the processor typically includes many other elements that are not shown for convenience. Of course, some of those elements may supply data to or utilize data from the registers in the stack, although they do not directly participate in the exemplary ON/OFF control algorithm.

For purposes of this first example, it again is assumed that the physical register stack 25 includes 128 registers PR0 to PR127 and is divided into four banks for purposes of power control. Again, Bank 0 (27) includes registers PR0 to PR31; and Bank 1 (29) includes registers PR32 to PR63. In turn, Bank 2 (31) includes registers PR64 to PR95; and Bank 3 (33) now includes registers PR96 to PR127.

Although connections and other elements are not shown for convenience, the individual registers in the stack 25 receive data from and supply data to other elements of the processor and/or separate storage. For example, the registers may be initially loaded with data from memory, which may reside on the processor chip or on a separate chip. The registers provide that data to core processing elements for processing and receive and store results. Data is transferred to/from the Backing Store as registers are temporarily reallocated, and data may be transferred back to memory when a particular operation is complete. In general, the operations of the registers in the physical register stack file 25 are the same as those of well known register stack files and will not be discussed in detail herein, except where such operations impact on or are influenced by the power control algorithm(s) of the present teachings.

The active status of the banks 27-33 of the stack 25 can be controlled in response to selection signals from the power control 37, in any of a variety of known ways. For purposes of general discussion, FIG. 2 shows a signal ($S_{RD}$) needed for register drive, and generic gate circuits for coupling the $S_{RD}$ signal to the banks in response to bank power control signals from the power control 37. For example, the gate 41 selectively supplies the register drive signal $S_{RD}$ to Bank 0 (27) in response to a power control signal from the control 37, and the gate 43 selectively supplies the register drive signal $S_{RD}$ to Bank 1 (29) in response to another power control signal from the control 37. Similarly, the gate 45 selectively supplies the register drive signal $S_{RD}$ to Bank 2 (31) in response to a power control signal from the control 37, and the gate 47 selectively supplies the register drive signal $S_{RD}$ to Bank 3 (33) in response to another power control signal from the control 37. The gates may be logic gates, switches, combinations thereof, or any other circuit configured to supply the appropriate type of signal to the register banks in response to appropriate selection signals from the control 37.

As noted, a number of different techniques may be used to control the ON-OFF status of the register banks. To insure full understanding, it may be helpful to consider two examples.

Figure 3:
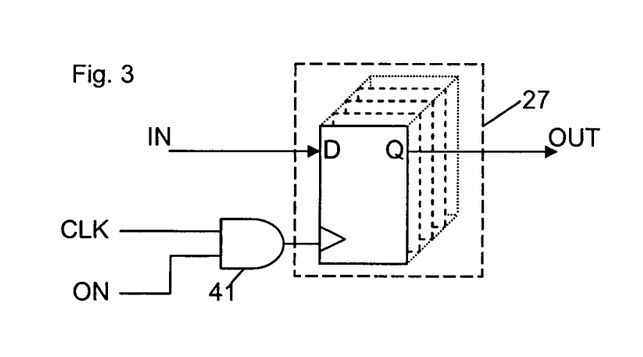
FIG. 3 is a first graphic illustration of a gate circuit for activating and deactivating a register bank by controlling the clock signal, in response to the power control.

In a first example, the banks are selectively activated/deactivated by controlling whether or not the necessary clock signal is supplied to each bank. FIG. 3 shows such control as applied to logic circuits 27. In the example, the gate 41 is an AND gate. The clock signal (CLK) is applied to one input of the AND gate 41, and the ON/OFF control signal is applied to the other input from the power control 37. When the control signal is ON, the gate 41 applies the clock signal (CLK), which allows the logic of register bank 27 to receive data IN and supply data OUT, in the normal manner. When the control signal is OFF, the gate 41 blocks the clock signal (CLK). In this state, the logic of register bank 27 will not cycle, and therefore it draws less power. Similar control may be used on the other banks.

Figure 4:
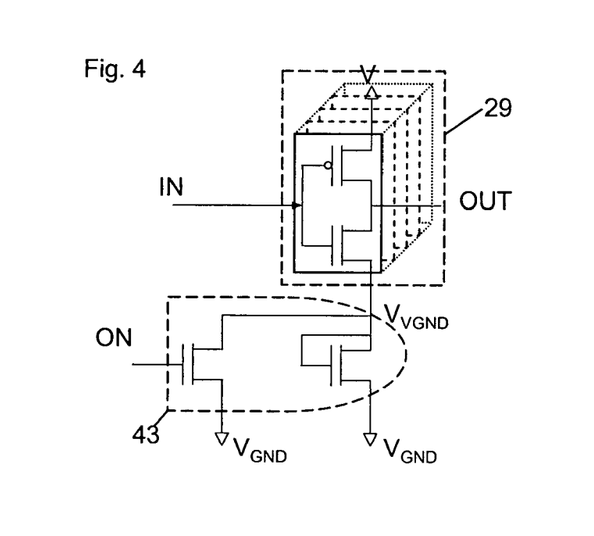
FIG. 4 is a second graphic illustration of a gate circuit for activating and deactivating a register bank by controlling power, in response to the power control.

In another example, power to each bank is turned on and off. This may be implemented by controlling connection to the supply voltage or by selective connection to ground, as shown in the example of FIG. 4. The direct power control has the advantage in that it eliminates leakage current of inactive register banks. In the example of FIG. 4, two transistors serve as the gate 43 to selectively connect the CMOS circuitry of the bank 29 to ground. When the control 37 applies an ON state signal to the gate 43, the gate provides the ground connection. The circuitry of bank 29 draws power, between supply voltage (V) and ground (GND), and the bank operates as described herein. When the power control 37 turns the gate 43 OFF, the gate disconnects the circuitry of bank 29 from ground, power is cut off, and the bank 29 is deactivated. Similar power control may be used for the other banks.

Those skilled in the art will recognize that other techniques may be used to control the ON/OFF states of the register banks. Also, a given processor may implement a combination of different techniques on the different banks forming the stacked register file 25.

Returning to FIG. 2, the power control 37 is a finite state machine. The state machine may be implemented as a programmable processor but may also be formed of circuits and/or logic blocks for generating desired outputs in response to the specific inputs, that is to say, so as to implement the particular control algorithm. In the examples (e.g. FIGS. 2 and 8), the state machine implements a single control algorithm, although some parameters of the algorithm may be set by the processor. Those skilled in the art will recognize that the control may be designed to implement two or more algorithms selectively, in response to a selection or control input from the processor or a user. It may also be possible to disable the power control algorithm and operate with all of the registers ON, for example, in a temporary 'high performance' mode.

When implementing power control, the state machine of the control 37 is responsive to certain input information, to selectively output the signals to activate the banks 27-33 of the register stack file 25, in accord with the particular power control algorithm. In this example, the state machine of the control 37 is responsive to signals from several elements of the processor that interact with or utilize the stack 25. Connections to the power control 37 are shown, as they relate to the activation/deactivation of the register banks, although the normal connections of other processor elements to/from the stack 25 are omitted from this drawing for ease of illustration.

In the example, the power control 37 is responsive to the high level processor control element 51. The processor control 51 may use various control registers, either software controlled or internally controlled, to change power settings, preferences, thresholds, etc. used by the power control 37.

The power control 37 also is responsive to several signals from the register file control element 53. The register file control 53 is the element that normally controls allocation and operation of the registers of the stacked register file 25, for example, by naming/renaming those registers to functions used by various processes. The control 53 uses a modulus corresponding to the number of active registers, to set the top of stack (TOS) point of the file, to identify the Register Stack Base (RSB) register, and to generate any other pointers used for wrapping and/or other management of the stacked register file. In a standard 128 register stack, for example, the control 53 would operate in modulo 128; and the control 53 uses that modulo to control the stack 25 when all four banks 27-33 are active. However, the register file control 53 adjusts it modulo counting, to 32, 64 or 96, when only one, two or three of the banks are active. Hence, the power control 37 provides a signal $B_{ON.RSC}$ to the register file control 53, indicating the number of banks powered on, and the register file control 53 sets its internal counting logic to use the corresponding modulo number, in its pointer setting processes and the like.

The ALLOC instruction is an explicit instruction (call) to allocate a number of registers to a given process. A de-allocation is a return or response essentially indicating a recovery of registers from the process when no longer needed. These instructions therefore define the number of registers that are needed at any given time. The register file control 53 provides the power control 37 with this information on the number of registers allocated and de-allocated, for use in activating and deactivating banks in the stacked register file. The register file control 53 also provides the pointer TOS and certain numeric values A and D as discussed below.

Figures 12A, 12B:
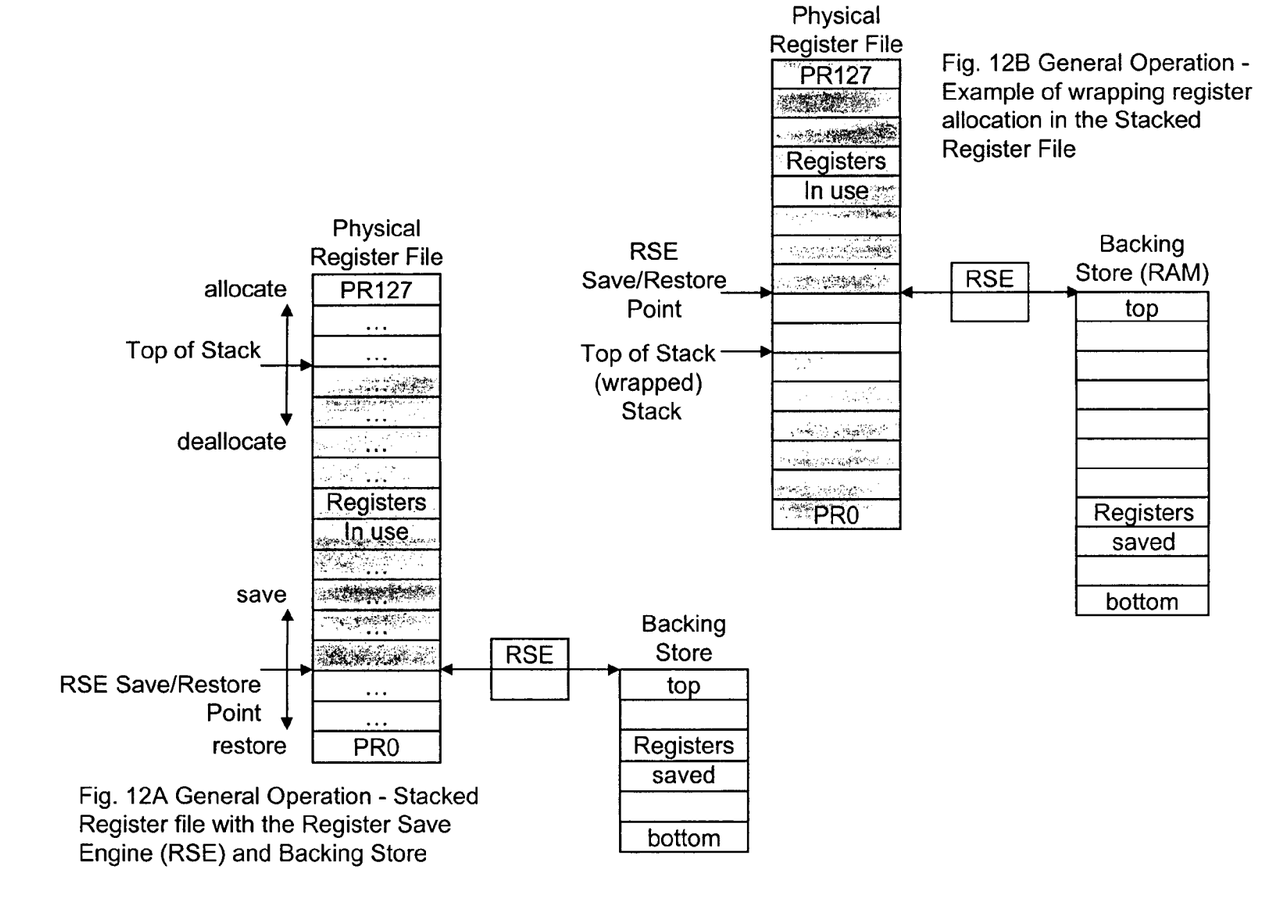
FIG. 12A is a logical diagram useful in explaining general operation of the stacked register file with a Register Save Engine (RSE) and Backing Store.
FIG. 12B is a logical diagram useful in explaining general operation of an example of wrapping register allocation in the stacked register file.

The register save engine (RSE) 55 automatically saves and restores data from and to registers in the stack file 25 as needed to a Backing Store held in memory (see FIGS. 12A and 12B). In general, the operation of the RSE 55 is the same as in a normal processor. However, like the register file control 53, the RSE counts in a modulo number corresponding to the number of active registers, in this case to set the position of the Register Save Engine Save/Restore Point (RSEP). Hence, the power control 37 supplies a signal $B_{ON.RSE}$ to the RSE 55, indicating the number of banks powered on, and the RSE 55 adjusts its operations accordingly. The $B_{ON.RSC}$ and $B_{ON.RSE}$ signals are similar, but may not be exactly the same in all instances.

In the illustrated implementation of the fixed ordering algorithm, each bank 27-33 is under individual control, so that it can be activated and deactivated independently of the other banks making up the stack 25. The processor can then operate in low-power mode, with respect to power consumed by the registers of the physical stack or file 25, by activating banks only when needed and powering down unneeded banks.

The example of FIG. 2 utilizes a fixed ordering technique. The stack 25 often runs with only one bank 27 of registers powered ON, and the control 37 only powers up additional register banks if more than one bank of registers is needed by a single allocation.

It may be helpful to consider the fixed ordering algorithm example in somewhat more detail, using the following definitions:

Let R be the number of registers in each Bank;
Let B the number of total banks, numbered from 0 to B-1; Hence, there are a total of B*R stacked registers;
Let B_On be the number of banks powered on;
Let A be the number of registers requested for allocation;
Let D be the number of registers requested for deallocation;
Let TOS be the position of the top of register stack;
Let RSEP be the position of the Register Save Engine Save/Restore Point In the nomenclature used for the present example, B×R would be 96, the total number registers available for physical wrapping in the stacked register file. The present example architecture actually specifies registers R0-R31 as global with no remapping, and only registers R32-R127 are remapped and may be subject to the power control algorithm. For discussion here it was assumed that all 128 registers may be remapped (B×R=128) and subject to power control.

In the fixed ordering example, banks are always powered on in strictly increasing order: first Bank 0 then Bank 1 etc., through Bank B-1. In the four bank example, this means that Bank 0 (27) is powered first (virtually always ON); Bank 1 (29) is powered next; Bank 2 (31) is powered next; and Bank 3 (33) is powered last (ON only when a function needs more than 96 registers). Conversely, banks are always powered off in strictly decreasing order: first Bank B-1, then Bank B-2 etc., through Bank 1. In the four bank example, this means that Bank 3 (33) is powered down first; Bank 2 (31) is powered down; then Bank 1 (29) is powered down. Bank 0 (27) typically remains ON, during minimal low power operation of the processor. In this first mode, additional banks are powered on only when A≧B_On*R. Banks are powered off only when TOS>RSEP.

An exemplary algorithm for this operating mode may as follows:

1. Start with only Bank 0 (27) powered on (R registers).
2. On a register allocation request (due to ALLOC instruction):
   a. If (A<B_On*R), use the currently powered register banks as a B_On *R sized wrapping register file. This means that all arithmetic for the RSB, TOS, and RSEP follows modulo-(B_On*R) arithmetic.
   b. If (A≧B_On*R), then
      i. Let B_On_previous=B_On;
      ii. While (A≧B_On*R), power on another bank (B_On++);
      iii. Increment (TOS+=A) mod (B_On*R);
      iv. While (RSEP>TOS), use modulo-((B_On−1)*R, the old value) arithmetic with the RSEP point until it wraps around to physical register 0. This ensures that registers currently allocated between TOS and PR0 are correctly saved.
v. Go to Step 2.
3. On a register deallocation (due to call return, etc.):
a. If ((TOS−D) mod (B_On*R)>RSE Save/Restore Point),
i. While ((TOS−D) mod (B_On*R)<(B_on−1*R)), power off another bank (B_On−−);
ii. Decrement (TOS−=D) mod (B_On*R);
iii. Go to Step 2.

$B_{ON}$ corresponds to the RSE.N_STACKED_PHYS, which represents the number of stacked registers, typically 96. However, using the implementation of FIG. 2, this value varies depending on the number of banks that are active.

The RSB value corresponds to RSE.BOF (RSE bottom of file). The TOS value corresponds to RSE.BOF+CFM.sol. The RSEP value then corresponds to RSE.LoadReg, which is the physical register number one greater than the next register to be loaded in the modulo corresponding to the number of stacked physical registers.

Figure 5:
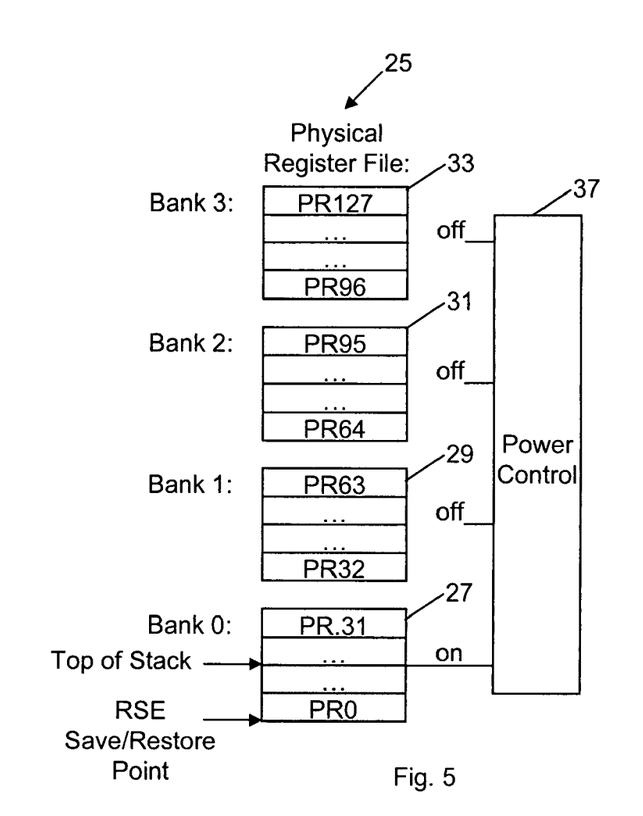
FIG. 5-7 are diagrams of the register file and power control of FIG. 2 in three different states, during operation in accord with the first power control algorithm.
Figure 6:
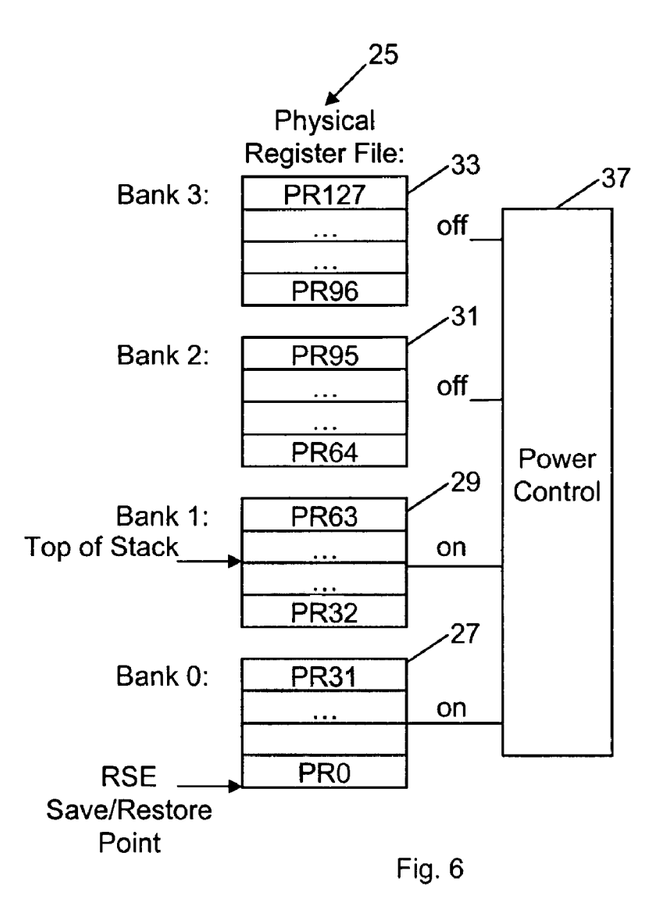
Figure 7:
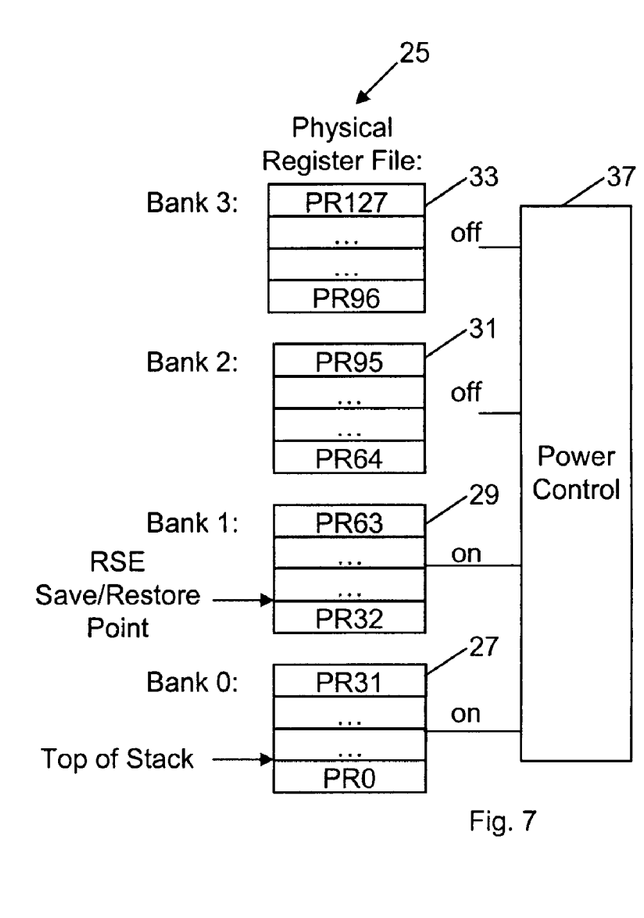

FIGS. 5-7 depict several exemplary states in the operation of the stack in accord with this first exemplary ordering algorithm. In the state shown in FIG. 5 the current allocation utilizes less than 32 registers. The RSE Save/Restore Point (RSEP) is below register PR0, that is to say at the bottom of the physical register stack 25. The top of stack (TOS) pointer identifies one of the higher registers in Bank 0 (27). The RSE performs spill and fill operations on the registers above the top of the stack point, with wrap around to the RSE Save/Restore Point, in this case, below register PR0. The allocated active registers are those in the range from PR0 to the register below the TOS pointer. In this state, the power control 37 provides the ON signal to power only one bank Bank 0 (27). The power control 37 provides OFF signals to the other banks 29-33, so that those banks are inactive. While operating with less than or equal to 32 registers allocated, the system will remain in a state similar to that of FIG. 5 except that the TOS and RSE Save/Restore Point will move, to facilitate spill and fill operations through the RSE. Wrap around of these pointers will remain within Bank 0. In so doing, the counting operations of control 53 and RSE 55 used to move these pointers will utilize a counting modulo linked to 32, the number of registers in the active Bank 0 (27).

The specific state shown in FIG. 5 is favorable for transition up to a state using registers in two banks, when more than 32 registers are needed. However, if the processing in Bank 0 has a top of the stack (TOS) pointer that is physically below the save/restore point due to wrapping within Bank 0, the processor needs to delay activation of the next bank Bank 1 until the save/restore point has wrapped around and is physically below the TOS pointer again (until TOS>RSEP) before activating the next higher bank. This delay insures that the data in the registers in Bank 0 that are physically above the save/restore point before the transition are not lost due to a premature allocation to a process requiring more registers.

In the example illustrated in FIG. 6, the current allocation utilizes more than 32 but less than 64 registers. In this example, the power control 37 provides ON signals to activate both Bank 0 (27) and Bank 1 (29). The power control 37 provides OFF signals to the other two banks 31 and 33, so that those banks are inactive. FIG. 6 shows such a state where the RSE Save/Restore Point is at register PR0, that is to say at the bottom of the physical register stack 25. The top of stack (TOS) pointer identifies one of the higher registers in Bank 1 (29). The allocated active registers are those in the range from PR0 to the register below the TOS pointer. Unallocated active registers in the Bank 1 (29) are those between the TOS point and the RSE Save/Restore Point, which is currently below register PR0. The RSE performs spill and fill operations on the registers above the top of the stack point in Bank 1, with wrap around to the RSE Save/Restore Point, which in this example is below register PR0.

The wrap-around processing by the RSE engine is substantially similar to that when using the full 128 register stack, except that the wrap around counting is limited to the 64 registers of active Banks 0 and 1. Such processing leads to a state such as that shown in FIG. 7. There, the current allocation utilizes more than 32 but less than 64 registers. The power control 37 still provides ON signals to activate both Bank 0 (27) and Bank 1 (29); and the power control 37 still provides OFF signals to the other two banks 31 and 33, so that those banks are inactive. However, in this state, the RSE Save/Restore Point is at a register in Bank 1, that is to say at or above PR32. The processing has wrapped around into the registers of Bank 0, so the top of stack (TOS) pointer identifies one of the registers in Bank 0, such as register PR0.

Of course, the ordering algorithm supports similar transitions using three banks of registers and using all four of the banks of registers. As was the case when only one bank was active, the pointers must transition from the wrap around state (like in FIG. 7) to a state where TOS>RSEP (like in FIG. 6), before the control 37 activates the next bank of registers to satisfy a further increased allocation. For example, if there is a need to transition to a 3 or 4 bank active state, from a state such as that shown in FIG. 7, it is necessary to allow the RSE processing to move the Save/Restore Point up through Bank 1 (29) and wrap around again to a point in register Bank 0 (27), like the state shown in FIG. 6, to insure that the data in the registers in the range from the previous RSE Save/Restore Point (shown in FIG. 7) to register PR63 at the top Bank 1 (29) have been saved to the Backing Store in memory. The requirement for TOS>RSEP similarly applies for the transition from 3 banks to 4 banks. With similar constraints it is also possible to transition directly to higher numbers of active banks, e.g. from 1 bank to 3 or 4, or from 2 banks to 4 banks.

Each transition down to a smaller number of active banks also must wait for the proper state of the pointers. Specifically, the save/restore point at the bottom of the active stack of registers must have wrapped around and be within the bank(s) that will remain active. The top of the stack pointer must be above the save/restore point and be located or can be safely moved to a point in the bank(s) that will remain active.

Once the allocation crosses the boundary between banks, from Bank 0 to Bank 1 in our example, the higher number of banks remain active until the register allocation reaches a state that allows for transition back to a lower number of active banks. In our example, such a new allocation state would allow transition back from Bank 1 being active to a state in which only Bank 0 is active.

For example, if de-allocation of registers to a number below 32 is pending when the RSE Save/Restore point and the top of stack point are located as shown in FIG. 7, it is necessary to continue processing by the RSE until the top of stack point and the RSE Save/Restore Point are both back within Bank 0, then the power control 37 can turn the other bank, Bank 1, off to return to the lower state as shown in FIG. 5.

The compiler may vary its allocations of registers. For designs intended to optimize performance, the compiler may allocate more registers to increase performance. However, with the power control function, this will increase the occasions when more banks are powered on and reduce the power savings. A less aggressive register allocation, either in another processor design or when one processor is compiling in a lower power mode, would allocate fewer registers at the cost of performance. Such operations, however, would increase the advantages obtained by the register bank power control.

In the example, the numbers of registers in the banks define thresholds for determining when to power banks on and off to substantially match register allocations. In the discussion above, these thresholds matched the numbers of registers in the banks and thus corresponded to the boundaries of the banks. In a variation to the above algorithm, the triggers or thresholds to power on or power off banks can be varied with additional threshold offsets (i.e. check for A+T≧B_On*R), to begin powering on the banks ahead of time and to delay their powering off. This can be particularly helpful for masking the powering on/off time.

In the example discussed above, Bank 0 (27) is always ON. Those skilled in the art will recognize that for such an implementation gated control of the operational state of that bank by the power control 37 is unnecessary. Hence, it would be possible to limit control to activation and deactivation of the operational status of the other banks, although the methodology or algorithm for controlling the other banks would operate essentially as described above. In a particularly simple implementation, the stack may be divided into only 2 banks, with one bank ON all the time, and the other bank ON/OFF controlled in accord with the fixed ordering algorithm.

By dividing the stacked register file into banks and controlling activation of the banks, the processor requires power to fewer registers most of the time.

Various power control algorithms may be used to activate and deactivate the banks. The above example used a fixed ordering example. A specific feature of the fixed algorithm described in the above example is that it powers banks on/off fairly infrequently. New banks are only powered on when a function requires a simultaneous register allocation that is greater than the number of already powered registers. Similarly, banks are powered off only when specific conditions are met. This makes it suitable for limiting the frequency with which banks are powered on/off. Consider now an example using variable ordering of the power on/off operation of the register banks.

As will be seen from the following discussion, with the variable ordering algorithm it is not necessary to modify the modulo counting of the register control and RSE because the register allocation loops through the entire stack, in a manner analogous to that in an entirely active stack (e.g. as in FIGS. 12A and 12B). The second exemplary algorithm powers on/off portions of the register file more often, however, this results in a potentially closer fit of registers that are powered to registers that are actually needed at the moment. Instead of powering on and powering off the register banks in a fixed, pre-determined order, the ordering implemented by the second algorithm is completely dependent on the processor's code behavior.

Figure 8:
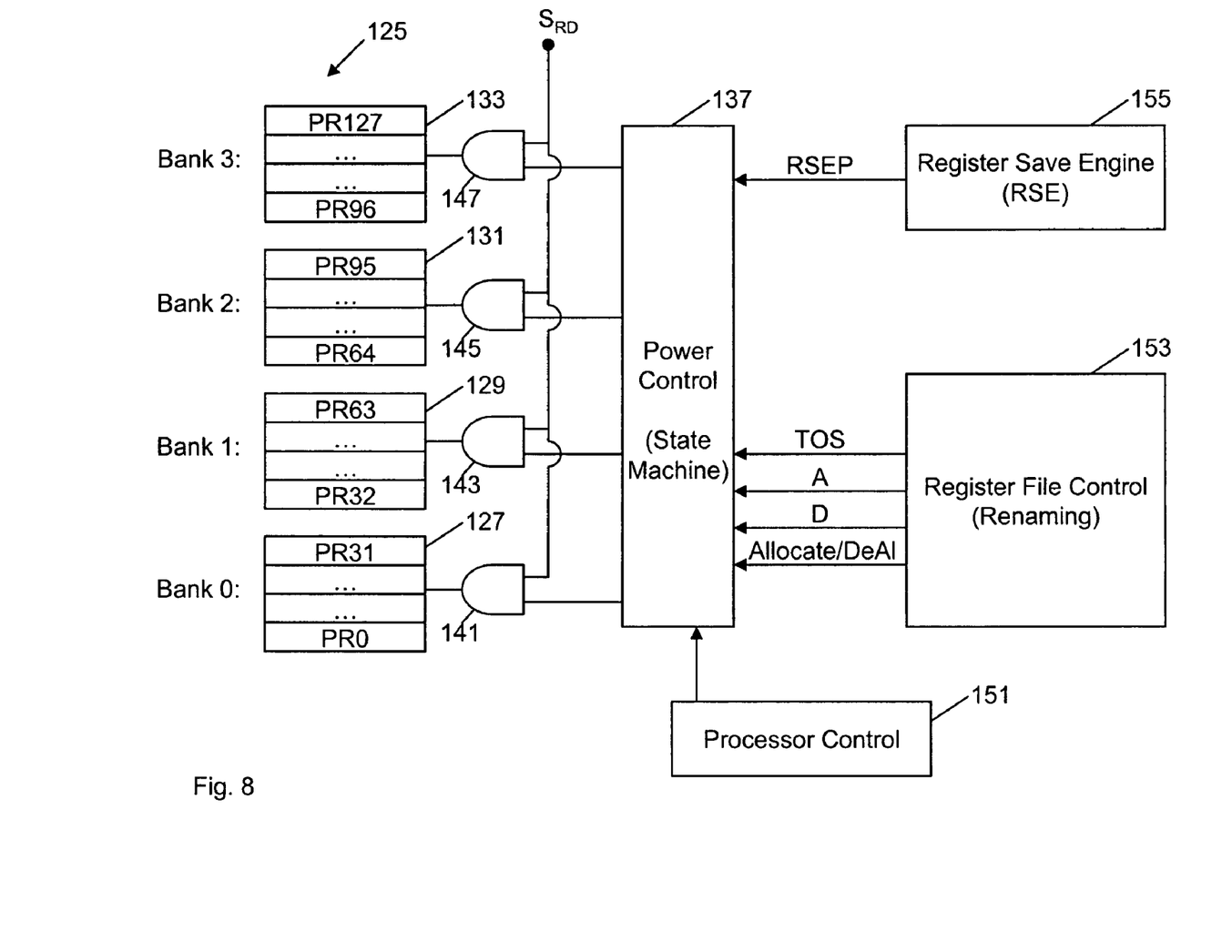
FIG. 8 is a functional block diagram of a portion of a processor, including the banks and power control of a stacked register file and certain elements that interact with that control, for implementing a second example of a power control algorithm that utilizes a variable ordering scheme to activate and deactivate the banks of the stacked register file.

FIG. 8 is a functional block diagram of a portion of a processor, implementing the power control, using the variable ordering algorithm. Elements of the processor are shown that are involved in the register operations and power control of the register banks. Those skilled in the art will recognize that the processor typically includes many other elements that are not shown for convenience. Of course, some of those elements may supply data to or utilize data from the registers in the stack, although they do not directly participate in the exemplary ON/OFF control algorithm.

For purposes of this second example, it again is assumed that the physical register stack 125 includes 128 registers PR0 to PR127 and is divided into four banks for purposes of power control. For purposes of discussion, all registers are subject to wrapping, and all of the banks are subject to power control. Again, Bank 0 (127) includes registers PR0 to PR31; and Bank 1 (129) includes registers PR32 to PR63. In turn, Bank 2 (131) includes registers PR64 to PR95; and Bank 3 (133) includes registers PR96 to PR127.

Although connections and other elements are not shown for convenience, the individual registers in the stack 125 receive data from and supply data to other elements of the processor and/or separate storage. For example, the registers may be initially loaded with data from memory, which may reside on the processor chip or on a separate chip. The registers provide that data to core processing elements for processing and receive and store results. Data is transferred to/from the Backing Store as registers are temporarily reallocated, and data may be transferred back to memory when a particular operation is complete. In general, the operations of the registers in the physical register stack file 125 are the same as those of well known register stack files and will not be discussed in detail herein, except where such operations impact on or are influenced by the power control algorithm(s) of the present teachings.

The active status of the banks 127-133 of the stack 125 can be controlled in response to selection signals from the power control 137, in any of a variety of known ways. For purposes of general discussion, FIG. 8 shows a signal ($S_{RD}$) needed for register drive, and generic gate circuits for coupling the $S_{RD}$ signal to the banks in response to bank power control signals from the power control 137. For example, the gate 141 selectively supplies the register drive signal $S_{RD}$ to Bank 0 (127) in response to a power control signal from the control 137, and the gate 143 selectively supplies the register drive signal $S_{RD}$ to Bank 1 (129) in response to another power control signal from the control 137. Similarly, the gate 145 selectively supplies the register drive signal $S_{RD}$ to Bank 2 (131) in response to a power control signal from the control 137, and the gate 147 selectively supplies the register drive signal $S_{RD}$ to Bank 3 (133) in response to another power control signal from the control 137.

The gates may be logic gates, switches, combinations thereof, or any other circuit configured to supply the appropriate type of signal to the register banks in response to appropriate selection signals from the control 137. Like the earlier example, the actual activation of the individual register banks may use clock gating (as in FIG. 3), circuitry to gate the power supply voltage (as in FIG. 4), circuitry to gate the connections to ground, or other means.

As in the earlier example, the power control 137 is a finite state machine, although the state machine 137 is responsive to a different set of inputs and controls bank activation and deactivation in accord with the variable ordering algorithm. The state machine 137 selectively outputs the signals to the gates 141-147 to activate the banks 127-133 of the register stack file 25, in accord with that power control algorithm. Again, the state machine of the control 137 is responsive to signals from several elements of the processor that interact with or utilize the stack 125. Connections to the power control 137 are shown, as they relate to the activation/deactivation of the register banks, although the normal connections of other processor elements to/from the stack 125 are omitted from this drawing for ease of illustration.

In the second example, the power control 137 is responsive to the high level processor control element 151. The processor control 151 may use various control registers, either software controlled or internally controlled, to change power settings, preferences, thresholds, etc. used by the power control 137.

The power control 137 also is responsive to several signals from the register file control element 153. Again, the register file control 153 is the element that normally controls allocation and operation of the registers of the stacked register file 125, for example, by naming/renaming those registers to functions used by various processes. The control 153 uses a modulus corresponding to the number of active registers, to set the top of stack (TOS) point of the file, to identify the Register Stack Base (RSB) register, and to generate any other pointers used for wrapping and/or other management of the stacked register file. In this example, the control 153 continues to use modulo 128, much as if all 128 registers were continuously active.

The ALLOC instruction is an explicit instruction (call) to allocate a number of registers to a given process. A de-allocation is a return or response essentially indicating a recovery of registers from the process when no longer needed. These instructions therefore define the number of registers that are needed at any given time. The register file control 53 provides the power control 37 with this information on the number of registers allocated and de-allocated, for use in activating and deactivating banks in the stacked register file. The register file control 53 also provides the pointer TOS and certain numeric values A and D as discussed below.

The register save engine (RSE) 155 automatically saves and restores data from and to registers in the stack file 125 as needed to a Backing Store held in memory (not shown). The operation of the RSE 155 is substantially the same as in the operations represented by FIGS. 12A and 12B. To set the position of the Register Save Engine Save/Restore Point (RSEP), the RSE 155 counts in a modulo number corresponding to the number of active registers, which in this case is 128, essentially as in a processor where all of the registers are powered all of the time.

Each bank 127-133 is under individual power control, so that it can be powered up/down independently of the other banks making up the stack 125. The processor can then operate in low-power mode, with respect to power consumed by the registers of the physical stack or file 125 by activating banks with registers in a range between TOS and RSEP and deactivating other banks.

The example of FIG. 8 utilizes an ordering algorithm that dynamically matches the number of banks simultaneously active to the register allocation. In this mode, the number of powered banks is determined only by the size of the current stack frame (or set number of frames) and banks are likely to be powered on/off more frequently because the position of the register stack top determines which banks are powered.

It may be helpful to consider the fixed ordering algorithm example in somewhat more detail, using the following definitions:

Let R be the number of registers in each Bank;
Let B the number of total banks, numbered from 0 to B-1;
   Hence, there are a total of B*R stacked registers;
Let TOS be the position of the top of register stack;
Let RSB be the position of the bottom of the current frame;
Let RSEP be the position of the Register Save Engine Save/Restore Point;
A pointer is said to point to Bank X whenever it points to a register in Bank X
Let Bank(pointer) be the number of the bank to which the pointer points.
Let (X,Z) be the banks between X and Z. A bank Y is said to be between banks X and Z if by incrementing X with modulo B arithmetic, we reach Y before Z.

Note that we can use the bracket notation to indicate inclusive: (X,Z] means banks between X and Z, including Z. In this variable ordering this mode banks are not powered on/off in any strict order, but powered banks are always adjacent (Bank B-1 is said to be adjacent to Bank 0). Banks are powered on/off whenever TOS or RSEP crosses a bank boundary. Thresholds correspond to the bank boundaries, although as discussed later, the trigger points may be offset somewhat from the boundaries associated with the numbers of registers in the banks. Wrapping of TOS, RSB, and RSEP only occurs from Bank N-1 to Bank 0 (Bank 3 to Bank 0 in our N=4 example); this means that modulo B*R arithmetic is always used to increment/decrement the TOS, RSB, and RSEP pointer values.

The algorithm for this operating mode is as follows.
1. Start with an arbitrary bank I powered on. Ensure that the RSB, RSEP, and TOS point to bank I.
2. Whenever TOS is about to be incremented (due to allocations) to point from a bank I to a bank J, power on any unpowered banks between I and J (including J). (Power on banks in (I,J].)
3. Whenever TOS is about to be decremented (due to deallocations) to point from a bank J to a bank I, and J !=I, and Bank(RSEP) !=J, power off banks between I and J (including J). (Power off banks in (I,J].)
4. Whenever RSEP is about to be incremented (due to register saves) to point from a bank I to a bank J, and I !=J, and Bank(TOS) !=I, power off banks between I and J (including I). (Power off banks [I,J).)
5. Whenever RSEP is about to be decremented (due to register restores) to point from a bank J to a bank I, power on any unpowered banks between I and J (including I). (Power on banks [I,J).)
6. Aggressively save register to the Backing Store in the background to minimize the number of banks that must be powered on.

This method works transparently with any number of banks and registers/bank.

Figure 9:
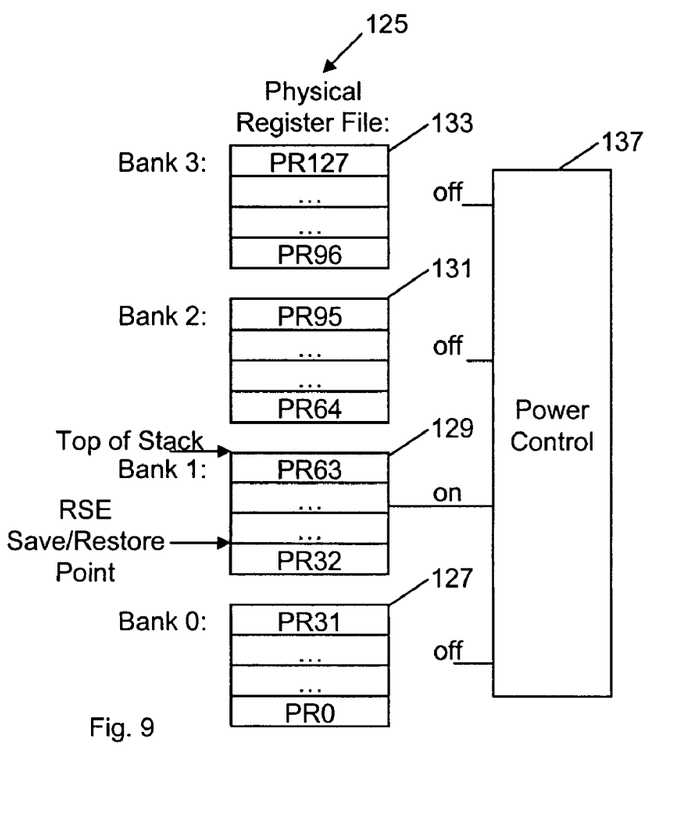
FIGS. 9-11 are diagrams of the register file and power control of FIG. 8, in three different states, during operation in accord with the second power control algorithm.
Figure 10:
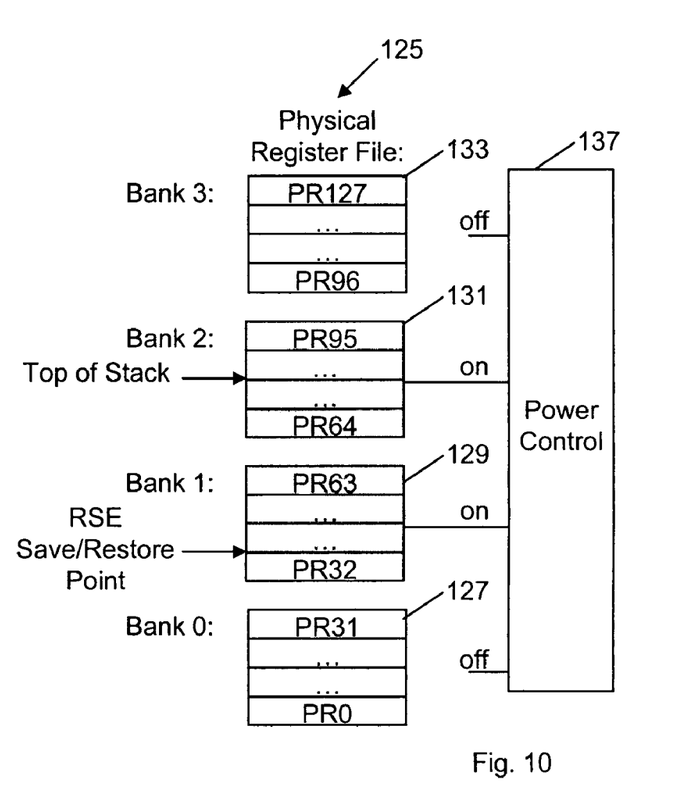
Figure 11:
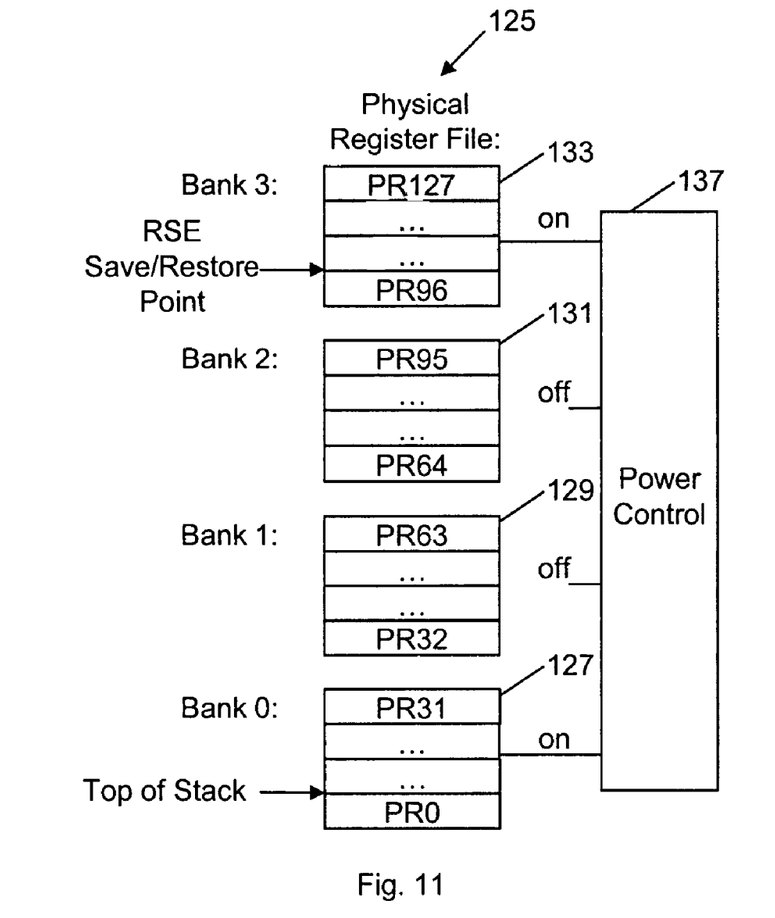

FIGS. 9-11 depict several exemplary states in the operation of the stack in accord with this second ordering algorithm. FIG. 9, for example, depicts a state in which the algorithm is operating with only one bank powered on. Note that Bank 0 (127) does not need to be powered on for Bank 1 (129) or any of the higher banks to be powered on. The current allocation utilizes less than 32 registers. In the illustrated state, the allocated registers are in Bank 1 (129), but similar states are possible with all registers allocated within any one of the other three of the register banks. In the illustrated state, the RSE Save/Restore Point (RSEP) is at or above register PR32, and the top of stack (TOS) pointer identifies one of the higher registers in Bank 1 (27), in this case PR63. In this state, the power control 137 provides and/or maintains the ON signal to activate or enable only one bank Bank 1 (127) and provides OFF signals to the other banks 127, 131 and 133. The active or allocated registers are in the region between the RSE Save/Restore Point (RSEP) and the top of stack (TOS) pointer, presently with no wrap around. The RSE performs spill and fill operations below the RSE Save/Restore Point.

Essentially, the register number at the boundary serves as a trigger point or threshold. When the TOS pointer reaches or exceeds the threshold, the power control 137 activates the next bank. When the RSEP pointer passes the threshold, the power control can deactivate the lower bank. In some implementations, thresholds may be offset from the actual boundaries.

Assuming a first single bank active state, such as that shown in FIG. 9, a transition to a two bank active state occurs when the top of stack pointer crosses the next higher bank boundary, say the boundary between register PR63 in Bank 1 (129) and register PR64 in Bank 2 (131) in the examples of FIGS. 9 and 10. FIG. 10 depicts a state in which the algorithm is operating with 2 banks powered on. In the example, the RSE Save/Restore Point is still at or above register PR32.

However, the top of stack (TOS) pointer has moved up and crossed the bank boundary into the registers in Bank 2 (131). Bank 2 and Bank 1 both have one or more registers in the allocated range from RSEP to TOS. The other banks do not.

In anticipation of transition to this state, the power control 137 has applied the ON signal to activate Bank 2 (131), while keeping Bank 1 (129) ON. The power control 137 continues to provide OFF signals to the other two banks 127 and 133, in this state example, so that those banks are inactive. Similar techniques are used to power up additional banks as the top of the stack moves up and wraps around into registers at the bottom of the stack (in Bank 0). Register banks are powered down in an analogous fashion, as the RSE Save/Restore Point moves up through the stack and wraps around to the bottom of the stack.

In the example, the transition went from one active bank to 2 and back to 1. Similar transitions occur as the allocation of registers and associated pointers move and as more banks are activated to support allocations of larger numbers of registers, that is to say transitions to and from states using three active banks of registers and to and from states using all four of the banks of registers.

FIG. 11 depicts a two bank active state, however, in this state the algorithm is operating 2 banks powered on and a wrapped Top-of-Stack. The RSE Save/Restore Point (RSEP) identifies a register above PR96 in Bank 3 (133), and the top of the stack (TOS) pointer identifies a register above PR0 in Bank 0 (127). In this state, the power control 137 has applied the ON signal to activate Bank 0 (127), while keeping Bank 3 (133) ON. The power control 137 provides OFF signals to the other two banks 129 and 131, in this state example, so that those banks are inactive.

In a variation to the above variable ordering algorithm, the triggers to power on or power off banks can be varied with additional threshold offsets to begin powering on the banks ahead of time and to delay their powering off. For example, TOS+T can be checked instead of TOS to determine whether to power on banks during register allocation; and similar thresholds can be used for the other triggers. This can be particularly helpful for masking the powering on/off time of banks.

Also, the thresholds used to trigger bank activation/deactivation and the aggressiveness of the RSE engine can be varied at run time in response to various factors, such as power consumption and heat, processor performance and frequency of bank activation/deactivation. This can be helpful for tuning the frequency of bank activations as desired.

Like the first example, the variable ordering of register bank power control enables the processor to power fewer registers much of the time.

A specific feature of the variable ordering algorithm is that it powers banks on/off fairly frequently in an attempt to match as closely as possible the number of powered registers to the current register usage. This makes it suitable when powering banks on/off does not carry significant costs and when it is important to minimize the number of powered banks. It also does not alter the arithmetic used to adjust the pointers used to manage the register stack.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A stacked register system for use in a processor, the system comprising:
   a stack of registers comprising a plurality of register banks, each register bank comprising at least one register, each register bank having a corresponding status value of ON or OFF; and
   a controller, the controller responsive to instructions operative to allocate a predetermined number of registers within the stack to one or more software functions, without assigning specific registers to corresponding instructions in the functions, the controller to selectively control the corresponding status value of one or more of the register banks,
   wherein the controller is responsive to register-allocating instructions by increasing a number of register banks that are assigned the corresponding status value of ON in response to at least one register-allocating instruction increasing a number of allocated registers, and by decreasing the number of register banks that have the corresponding status value of ON in response to at least one register-allocating instruction decreasing the number of allocated registers,
   wherein the controller assigns the corresponding status value of OFF to a particular register bank in response to a save/restore register stack pointer that moves outside the particular register bank.

2. The system of claim 1, further comprising one or more circuits to selectively connect one or more of the register banks to a power supply terminal and to selectively disconnect the one or more of the register banks from the power supply terminal, in response to a corresponding status value assigned by the controller.

3. The system of claim 1, further comprising one or more gate circuits to selectively supply a system clock signal to the plurality of register banks, in response to a clock request from the controller.

4. The system of claim 1, wherein when the number of allocated registers is less than or equal to a first threshold having a first predetermined relationship to a number of registers in a first register bank, the controller assigns the status value of ON to the first register bank, and wherein in response to a register-allocating instruction increasing the number of allocated registers to a number greater than the first threshold, the controller assigns the corresponding status value of ON to a successive one of the register banks.

5. The system of claim 4, wherein in response to a subsequent register-allocating instruction decreasing the number of allocated registers to a number less than or equal to a second threshold having a second predetermined relationship to the number of registers in the first register bank, the controller assigns the corresponding status value of OFF to the next successive one of the register banks.

6. The system of claim 5, wherein at least one of the first or second thresholds has a value equal to the number of registers in the first register bank.

7. The system of claim 5, wherein at least one of the first or second thresholds is offset from the number of registers in the first register bank by a predetermined offset value.

8. The system of claim 1, wherein a top of stack point is positioned within one of the register banks at a top of stack point position related to a number of registers in the stack of registers, and wherein the controller assigns the corresponding status value of ON to a particular register bank when the top of stack point position is within the particular register bank.

9. The system of claim 1, wherein at least one of the register banks comprises at least 32 registers.

10. The system of claim 1, wherein the stack of registers comprises at least four of the register banks, and each of the register banks comprises at least 32 registers.

11. A stacked register system for use in a processor, the system comprising:
- a stack of registers, the stack of registers comprising a first register bank comprising a first number of registers and a second register bank comprising a second number of registers; and
- means for selectively activating and deactivating at least one of the first and second register banks in response to instructions operative to allocate predetermined numbers of registers within the stack of registers to software functions without assigning specific registers to instructions in the functions,
- wherein the processor identifies a save/restore point for spill operations of a register save engine and wherein the means for selectively activating and deactivating deactivates at least one of the first or second register bank as a save/restore register stack pointer moves out of the respective register bank.

12. The system of claim 11, wherein:
- the means for selectively activating and deactivating activates the first register bank in response to a first register-allocating instruction that allocates a first number of registers that is less than or equal to a first threshold, the first threshold having a predetermined relationship to the first number of registers; and
- the means for selectively activating and deactivating activates the second register bank in response to a second register-allocating instruction that allocates a second number of registers, wherein the second number of registers is greater than the first threshold.

13. The system of claim 12, wherein the stack of registers further comprises a third register bank comprising a third number of registers, and wherein the means for selectively activating and deactivating activates the third register bank in response to a third register-allocating instruction that allocates a third number of registers, wherein the third number of registers is greater than a second threshold.

14. The system of claim 11, wherein:
- the allocation of registers indicates a top of stack point within the stack of registers; and
- the means for selectively activating and deactivating sequentially activates the first register bank as the top of stack point moves into the first register bank and activates the second register bank as the top of stack point moves into the second register bank.

15. The system of claim 11, wherein the means for selectively activating and deactivating comprises a power controller implemented as a finite state machine.

16. A method comprising:
- executing instructions operative to allocate predetermined numbers of registers within a stacked register file to one or more software functions without assigning specific registers to instructions associated with the one or more software functions;
- in response to a first register-allocating instruction allocating a number of registers that is less than or equal to a first threshold having a predetermined relationship to a first number of registers forming a first register bank in the stacked register file, maintaining the first bank of registers in an active state and maintaining registers forming a second register bank in the stacked register file in an inactive state; and
- in response to a second register-allocating instruction allocating a number of registers greater than the first threshold, maintaining the first bank of registers in the active state and activating the second register bank,
- wherein a particular register bank is placed in one of an active state and an inactive state in response to a position of a save/restore register stack pointer with respect to the particular register bank.

17. The method of claim 16, further comprising, in response to a third register-allocating instruction allocating another number of registers less than or equal to a second threshold having a predetermined relationship to the first number of registers forming the first register bank, the third register-allocating instruction received when the second register bank is active, maintaining the first register bank in the active state and deactivating the second register bank.

18. The method of claim 17, wherein at least one of the first or second thresholds equals the first number of registers.

19. The method of claim 17, wherein at least one of the first or second thresholds differs from the first number of registers by an offset.

20. A method comprising:
- executing instructions operative to allocate a corresponding predetermined number of registers within a stacked register file to each of one or more software functions, without assigning specific registers to instructions associated with each of the one or more functions, each allocation including a respective top of stack pointer and a respective save/restore register stack pointer; and
- in response to executing each of one or more register-allocating instructions, wherein the stacked register file comprises one or more register banks and each register bank comprises one or more registers:
- activating or maintaining in an active state each register bank of the stacked register file having at least one register in an instruction range defined by the respective save/restore register stack pointer and the respective top of stack pointer; and
- deactivating or maintaining in a deactivated state each register bank of the stacked register file that does not have at least one register in the instruction range,
- wherein a particular register bank of the one or more register banks is selectively deactivated in sequence as the respective save/restore register stack pointer is moved by the register-allocating instructions to a position outside the particular register bank.

21. The method of claim 20, wherein deactivating a particular register bank comprises disconnecting power to the particular register bank or disconnecting a processor clock signal from the particular register bank.

22. The method of claim 20, wherein:
- each of the register banks is selectively activated when a corresponding top of stack pointer is positioned within the corresponding register bank.

23. A method comprising:
- allocating predetermined numbers of registers within a stacked register file to one or more software functions, without assigning specific registers to instructions in the one or more software functions; and
- selectively activating and deactivating operation of one or more of a plurality of banks of registers within the stacked register file in response to the predetermined number of registers allocated,
- wherein a particular bank of registers is placed in one of an active state and an inactive state in response to a position of a top of stack point with respect to the particular bank of registers.

* * * * *